Dec. 30, 1924.

J. M. EVANS 1,520,814

AUTOMATIC WEIGHING APPARATUS

Filed Dec. 6, 1923     4 Sheets-Sheet 1

Inventor

Jesse M. Evans
Cyrus Rehr
Attorney

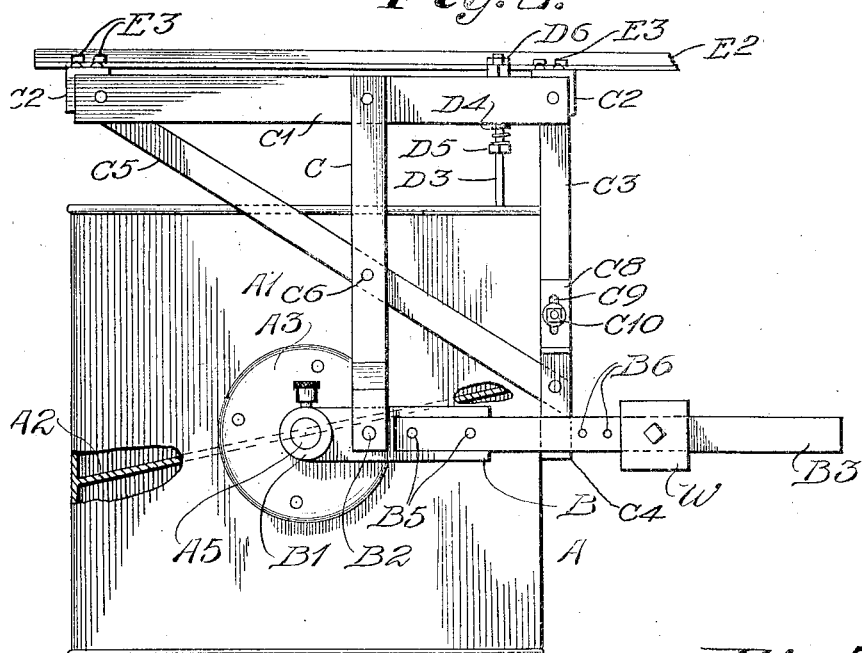
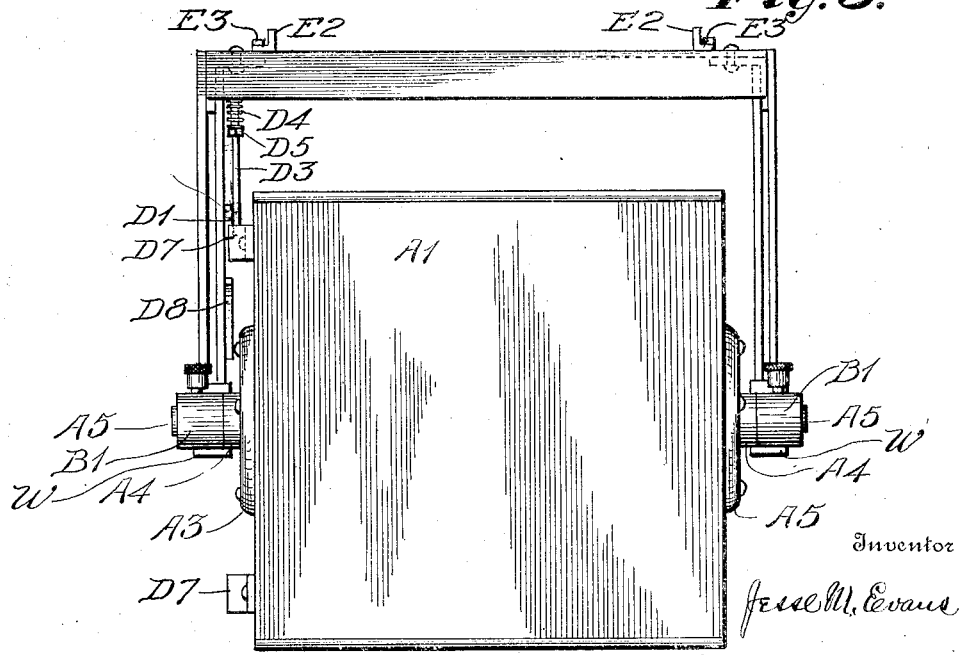

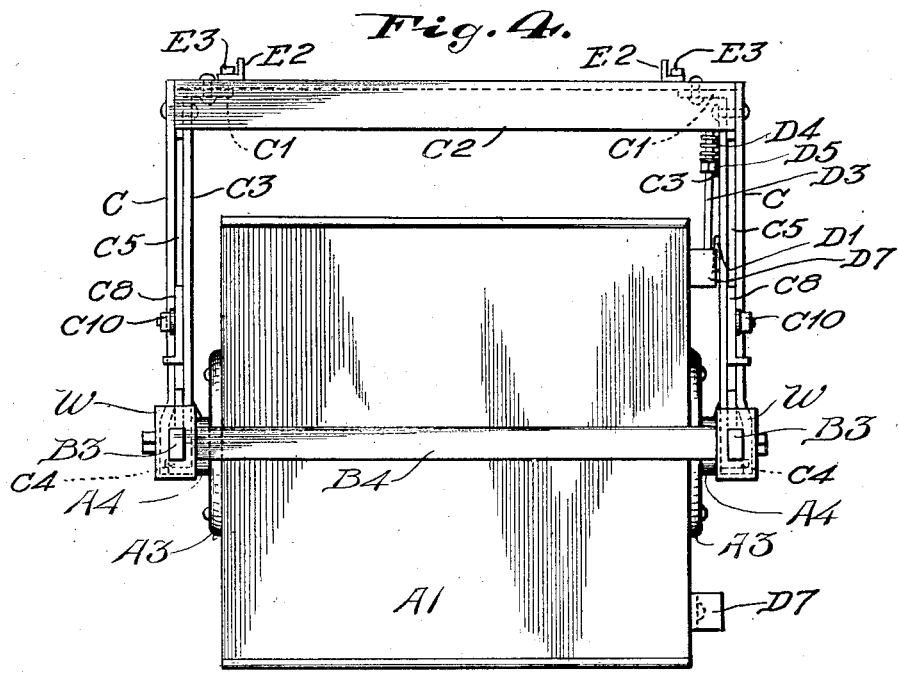
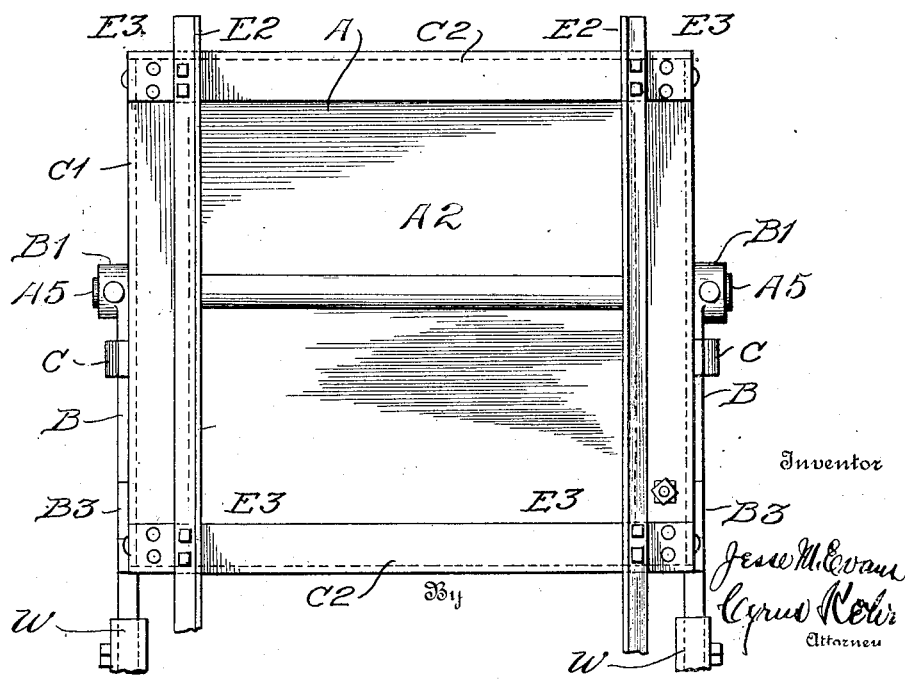

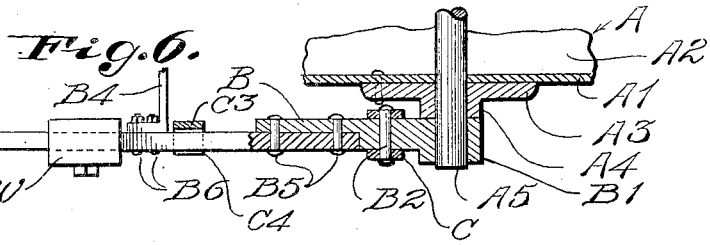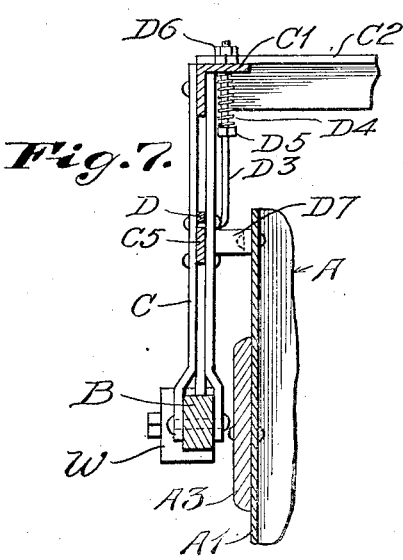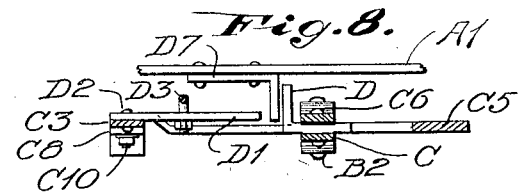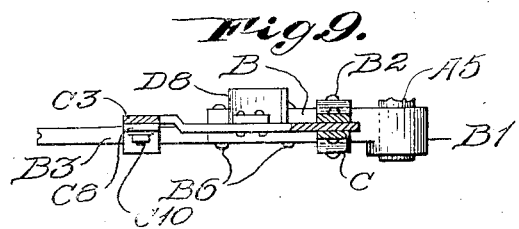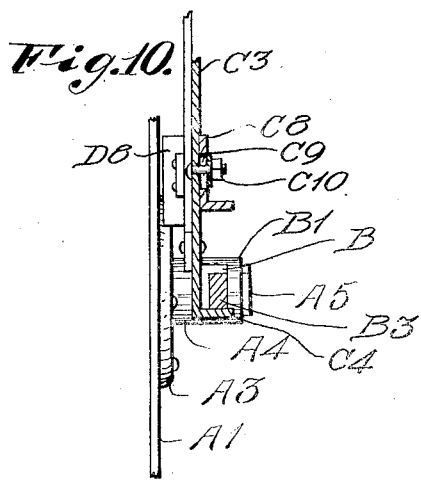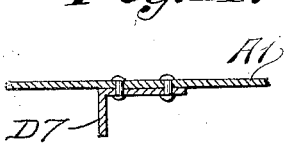

Patented Dec. 30, 1924.

1,520,814

UNITED STATES PATENT OFFICE.

JESSE M. EVANS, OF SPRINGFIELD, MISSOURI.

AUTOMATIC WEIGHING APPARATUS.

Application filed December 6, 1923. Serial No. 678,929.

*To all whom it may concern:*

Be it known that I, JESSE M. EVANS, a citizen of the United States, residing at Springfield, in the county of Greene and State of Missouri, have invented a new and useful Improvement in Automatic Weighing Apparatus, of which the following is a specification, reference being had to the accompanying drawing.

My improvement relates to weighing apparatus which contains a rotary body having a plurality of compartments arranged around the axis of the body and adapted to be brought successively into the upper position and there remain until filled with the material which weighs the desired amount, the force exerted by such material acting to release and turn the rotary body. My improved weighing apparatus is intended to be used especially for weighing lime or pulverized lime stone where those materials are produced in considerable quantities; but the apparatus is also adapted to be used for weighing other commodities.

In the accompanying drawings;

Fig. 2 is an elevation of the right hand side of said apparatus;

Fig. 3 is a front elevation;

Fig. 4 is a rear elevation;

Fig. 5 is a plan;

Fig. 6 is a horizontal section on the line, 6—6, of Fig. 1;

Fig. 7 is an upright, transverse section on the line, 7—7, of Fig. 1, looking toward the left;

Fig. 8 is a horizontal section on the line, 8—8, of Fig. 1;

Fig. 9 is a horizontal section on the line, 9—9, of Fig. 1;

Fig. 10 is an upright section on the line, 10—10, of Fig. 1, looking toward the right;

Fig. 11 is a horizontal section on the line, 11—11, of Fig. 1.

Figure 1:
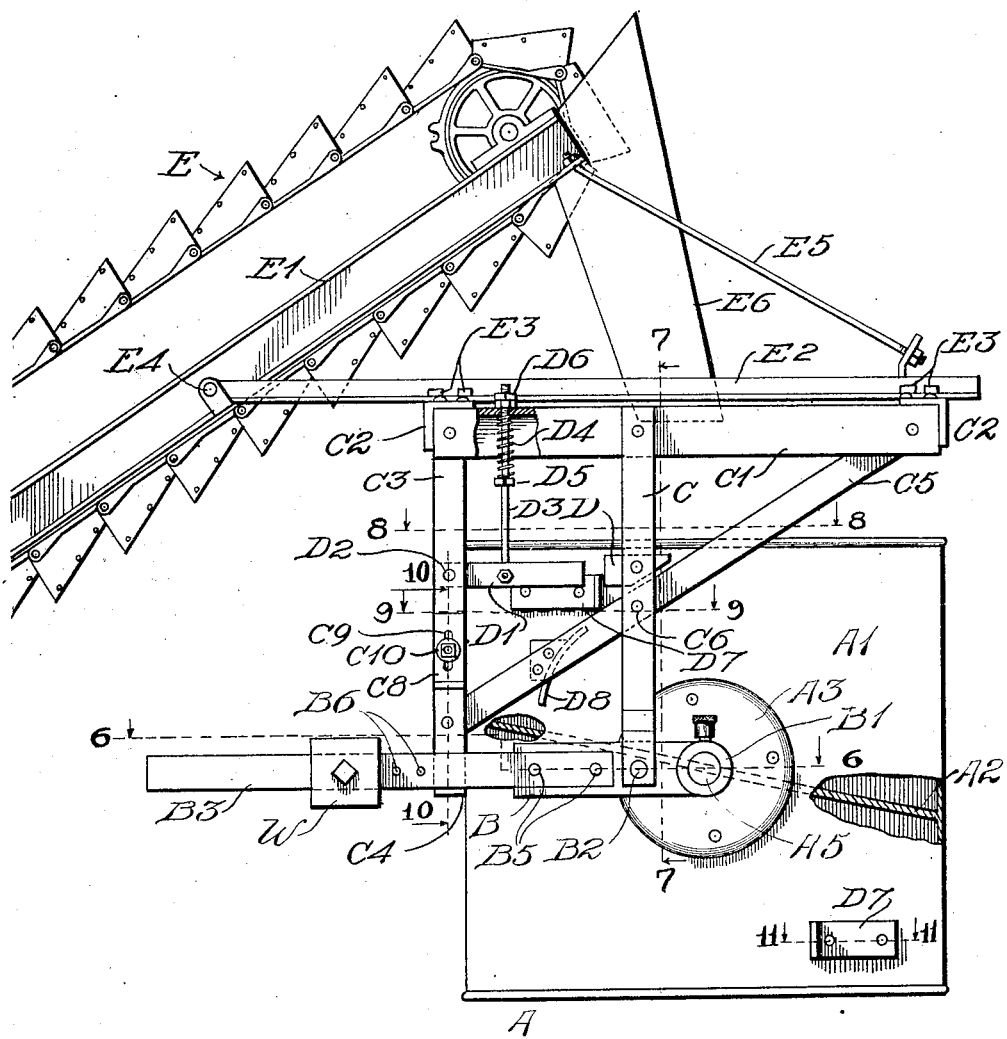
Fig. 1 is an elevation of the left hand side of an apparatus embodying my improvement.

Referring to said drawings, A is the rotary body. This body has four upright walls, $A^1$. On the outer face of each side wall (the left and the right) on the horizontal axial line of the body is a circular bearing plate, $A^3$, on which is a hub, $A^4$. An axle, $A^5$, extends through the body and through said hubs and is suitably secured in said hubs to cause said axle and said body to turn in unison. Each end of said axle rests rotatably in hubs, $B^1$, formed on one end of the casting member, B, which forms a part of a rocking structure pivoted by a bolt, $B^2$, extending through the member, B, to the adjacent stationary frame member, C. The rocking structure comprises the members, B and arms, $B^3$, and the connecting member, $B^4$, and the weights, W. The arms, $B^3$, are joined to the members, B, by means of bolts or rivets, $B^5$. Bolts or rivets, $B^6$, join the arms, $B^3$, to the cross member, $B^4$. It is preferable to use bolts at one side and rivets at the other side, the bolts permitting separating of one of the arms to permit applying the rocking structure to the ends of the axles, $A^5$. A weight, W, is placed adjustably on each arm, $B^3$. When the combined weights of the body, A, and the material in the body overbalance the weights, W, and the part of the rocking structure at that side of the pivots formed at the bolts, $B^2$, the rocking structure will be tilted, the body, A, going downward and the weights, W, and the arms, $B^3$, going up.

Within the body, A, is a partition, $A^2$, which joins the four upright walls, $A^1$, of the body in a plane in which lies the axle, $A^5$. Said partition is inclined to a horizontal plane cutting the axle when the body, A, is in the upright position, this inclination being such as to make the forward part of the upper compartment in the body deeper than the rear part of said compartment, whereby the larger weight of the material in said compartment will be forward of the axle, $A^5$. This preponderance of weight is used to release the latch mechanism, as will be described further on.

The upright frame members, C, are supported from the horizontal frame members, $C^1$, which form the sides of the upper part of the frame, the ends of the upper part of the frame being formed by the frame members, $C^2$. From the rear end of each frame member, $C^1$, an upright frame member, $C^3$, extends downward below the lower edge of the adjacent rocking structure arm, $B^3$. The lower end of the member, $C^3$, is turned horizontally across the lower edges of the arm, $B^3$, to form a ledge or support, $C^4$, on which the rear part of the rocking structure normally rests. At each side of the frame, the forward end of the frame member, $C^1$, and the lower end of the upright frame member, $C^3$, are connected by an oblique frame or brace member, $C^5$, which also crosses and is secured to the member, C, by a bolt or rivet, $C^6$. At the left hand side of the apparatus a fixed latch member, D, is applied to the inner face of the adjacent frame member, C. A horizontal latch bar, $D^1$, is placed parallel to and below the frame member, $C^1$, and pivoted by one end to the member, $C^3$, at $D^2$. The forward end of the latch bar reaches nearly to the latch member, D.

A rod, $D^3$, has its lower end pivoted to the latch member, $D^1$, and extends upward through the horizontal flange of the frame member, $C^1$. Immediately below said flange the rod is surrounded by an expanding coiled spring, $D^4$. Below said spring the rod is surrounded by an adjustable nut, $D^5$. On the upper end of the rod are two nuts, $D^6$. Said spring normally presses the latch bar downward as far as the nuts, $D^6$, permit. On the outer face of the adjacent wall, $A^1$, of the body, A, is a fixed lug or stop, $D^7$, which rests behind the latch member, D, when the rear part of the rocking structure rests on the supports, $C^4$, and the body, A, is in its upper position. The forward end of the pivoted latch member, $D^1$ is immediately at the rear of the space normally occupied by one of the stops, $D^7$, and prevents that stop from moving rearward. Thus the body, A, is held against turning in either direction. Another stop, $D^7$, is correspondingly placed on the lower part of the body, A, and is adapted to take its place in the space between the latch members, D and $D^1$, when the body, A, makes a half turn.

The position of the parts above described remains until the accumulation of material in the then upper compartment of the rotary body, A, is so heavy as to cause the tilting of the rocking structure, whereby the hubs, $B^1$, and the axle, $A^5$, and the body, A, are lowered sufficiently to bring the upper stop, $D^7$, below the fixed latch member, D. Then preponderance of weight of material forward of the axle causes rotation of the body clockwise as viewed in Fig. 1, whereby the upper compartment becomes the lower compartment and during its downward movement discharges its material. On the inner face of the brace, $C^5$, is a fixed cam, $D^8$, the lower end of which is the nearer the pivot formed by the bolts, $B^2$. Said cam is positioned to engage by its upper face the stop, $D^7$, when it is moving upward from its lower position. The cam forces the lug upward, whereby the empty body is lifted and the rocking structure is returned to normal position. After leaving the cam, the stop slides along the lower edge of the latch bar, $D^1$, and pushes said bar upward until the stop has passed the bar and is met and arrested by the fixed latch member, D. Immediately after the stop has passed the bar, $D^1$, the bar, $D^1$, is pressed downward by the action of the spring, $D^4$, acting through the rod, $D^3$, so that if the stop, $D^7$, rebounds after striking the latch member, D, the stop will meet the bar, $D^1$, and be arrested thereby. The weights, W, on the rocking structure also tend to move downward and lift the body, A, into its upper position. The cam, $D^8$, compels positive action for restoring the body to the upper position during the discharging of the filled compartment. Thus the cam constitutes a lifting member or lifting means.

To limit the upward movement of the rear part of the rocking member there is applied to the outer face of each frame member, $C^3$, above the adjacent arm, $B^3$, a stop, $C^8$, having an upright base in which is an upright slot, $C^9$. A binding bolt, $C^{10}$, extends through said slot and the adjacent frame member, $C^3$, for binding said stop to the member, $C^3$. By loosening said bolt, said stop may be adjusted up or down into the precise position desired for limiting the upward movement of the rocking structure, whereby the downward movement of the rotary body is limited. The rests or supports, $C^4$, limit downward movement of the rear part of the rocking structure.

The upper frame members, $C^1$, are formed of straight metal angle pieces, one of the flanges being turned downward and the other being placed above and turned inward. At the corners, the horizontal flanges of these members over-lap, as shown by the drawings, and are secured to each other by bolts or rivets, $C^7$.

The upright member, C, is preferably duplex or double, one part being at one side and the other at the other side of the upright flange of the member, $C^1$, and the brace, $C^5$, and the member, B.

The structure above described may be supported in any desired manner for convenient delivery of material into the body, A, and for disposing of the material discharged from said body. The drawings show said apparatus supported for receiving material directly from an elevating conveyor, the structure being supported by the upper end of the conveyor. The conveyor may rise from a machine (not shown) for crushing or pulverizing stone or other material; and a wagon or truck or railway car or other vehicle may be placed below the weighing apparatus to receive the material discharged from the body, A.

E is the conveyor. This is of ordinary type or construction. A brace, $E^1$, extends from the upper part of the conveyor to some part of the crusher or pulverizer.

Bars, $E^2$, extend horizontally across the front and rear plates, $C^1$, of the weighing apparatus and are secured thereto by bolts, $E^3$, said bars extend to the conveyor and are secured thereto by bolts, $E^4$. Braces, $E^5$, extend from the forward part of the frame structure obliquely upward to the upper end of the conveyor, E.

A spout, $E^6$, is positioned to receive material from the body of the conveyor and conduct the material by gravity downward into the body, A.

I claim as my invention:

1. In a weighing apparatus, the combination of a frame, a rocking structure pivoted to said frame, a rotary body pivoted on the forward part of the rocking structure and comprising a plurality of compartments opening away from the axis of said body and each compartment being deeper forward of the upright plane of the axial line when the compartment is in the upper position, stops on the rotary body, a latch member supported on the frame in the path of said stops when the rotary body is in its upper position, and a lifting member in the path of said stops when the rotary body is below its upper position, substantially as described.

2. In a weighing apparatus, the combination of a frame, a rocking structure pivoted to said frame, a rotary body pivoted on the forward part of the rocking structure and comprising a plurality of compartments opening away from the axis of said body and each compartment being deeper forward of the upright plane of the axial line when the compartment is in the upper position, stops on the rotary body, a latch member supported on the frame in the path of said stops when the rotary body is in its upper position, a yielding latch member in the path of the stops and near the fixed latch member, and a lifting member in the path of said stops when the rotary body is below its upper position, substantially as described.

3. In a weighing apparatus, the combination of a frame comprising upright members at each side of the frame, one of said members having at its lower end a support for the rocking structure, a rocking member pivoted to two others of said members, a rotary body pivoted on the forward part of the rocking structure and comprising a plurality of compartments opening away from the axis of said body and each compartment being deeper forward of the upright plane of the axial line when the compartment is in the upper position, stops on the rotary body, a latch member supported on the frame in the path of said stops when the rotary body is in its upper position, and a lifting member in the path of said stops when the rotary body is below its upper position, substantially as described.

4. In a weighing apparatus, the combination of a frame comprising upright members, a rocking structure pivoted to said frame, a rotary body pivoted on the forward part of the rocking structure and comprising a plurality of compartments opening away from the axis of said body and each compartment being deeper forward of the upright plane of the axial line when the compartment is in the upper position, stops on the rotary body, a latch member supported on one of the upright frame members in the path of said stops when the rotary body is in its upper position, and a lifting member in the path of said stops when the rotary body is below its upper position, substantially as described.

5. In a weighing apparatus, the combination of a frame comprising upright members, a rocking structure pivoted to said frame, a rotary body pivoted on the forward part of the rocking structure and comprising a plurality of compartments opening away from the axis of said body and each compartment being deeper forward of the upright plane of the axial line when the compartment is in the upper position, stops on the rotary body, a latch member supported on one of the upright frame members in the path of said stops when the rotary body is in its upper position, a yielding latch member in the path of the stops and near the other latch member, and a lifting member in the path of said stops when the rotary body is below its upper position, substantially as described.

6. In a weighing apparatus, the combination of a frame comprising upright members, a rocking structure pivoted to said frame, a rotary body pivoted on the forward part of the rocking structure and comprising a plurality of compartments opening away from the axis of said body and each compartment being deeper forward of the upright plane of the axial line when the compartment is in the upper position, stops on the rotary body, a latch member supported on one of the upright frame members in the path of said stops when the rotary body is in its upper position, and a yielding latch member in the path of the stops and near the other latch member, substantially as described.

7. In a weighing apparatus, the combination of a frame comprising upright members at the sides of the apparatus, one of said members at each side of the structure bearing means for limiting the movement of the rocking structure, a rocking structure pivoted to said frame, a rotary body pivoted on the forward part of the rocking structure and comprising a plurality of compartments opening away from the axis of said body and each compartment being deeper forward of the upright plane of the axial line when the compartment is in the upper position, stops on the rotary body, and a latch member supported on the frame in the path of said stops when the rotary body is in its upper position, substantially as described.

8. In a weighing apparatus, the combination of a frame comprising upright members at the sides of the apparatus, one of said members at each side of the structure bearing means for limiting upward and downward movement of the rocking structure, a rocking structure pivoted to said frame, a rotary body pivoted on the forward part of the rocking structure and comprising a plurality of compartments opening away from the axis of said body and each compartment being deeper forward of the upright plane of the axial line when the compartment is in the upper position, stops on the rotary body, and a latch member supported on the frame in the path of said stops when the rotary body is in its upper position, substantially as described.

9. In a weighing apparatus, the combination of a frame comprising upright members at the sides of the apparatus, one of said members at each side of the structure bearing means for limiting the movement of the rocking structure, a rocking structure pivoted to said frame, a rotary body pivoted on the forward part of the rocking structure and comprising a plurality of compartments opening away from the axis of said body and each compartment being deeper forward of the upright plane of the axial line when the compartment is in the upper position, stops on the rotary body, a latch member supported on the frame in the path of said stops when the rotary body is in its upper position, and a lifting member in the path of said stops when the rotary body is below its upper position, substantially as described.

10. In a weighing apparatus, the combination of a frame comprising upright members at the sides of the apparatus, one of said members at each side of the structure bearing adjustable means for limiting the movement of the rocking structure, a rocking structure pivoted to said frame, a rotary body pivoted on the forward part of the rocking structure and comprising a plurality of compartments opening away from the axis of said body and each compartment being deeper forward of the upright plane of the axial line when the compartment is in the upper position, stops on the rotary body, and a latch member supported on the frame in the path of said stops when the rotary body is in its upper position, substantially as described.

11. In a weighing apparatus, the combination of a frame comprising upper horizontal side and front and rear members joined to each other at their ends, two upright frame members extending downward at each side of the structure, means on one of said members for limiting the movement of the rocking structure, a rocking structure pivoted on a horizontal axis on the others of said upright frame members, frame supporting means above the rocking structure, a rotary body pivoted on the forward part of the rocking structure and comprising compartments opening outward from the axis of said body and being deeper forward of the upright plane of said axis when said compartment is in the upper position, stops on the rotary body, and latch means on the frame, substantially as described.

12. In a weighing apparatus, the combination of a frame comprising upper horizontal side and front and rear members joined to each other at their ends, two upright frame members extending downward at each side of the structure, means on one of said members for limiting the movement of the rocking structure, a rocking structure pivoted on a horizontal axis on the others of said upright frame members, a rotary body pivoted on the forward part of the rocking structure and comprising compartments opening outward from the axis of said body and being deeper forward of the upright plane of said axis when said compartment is in the upper position, stops on the rotary body, and two latch members on the frame, one of said members being yielding, substantially as described.

13. In a weighing apparatus, the combination of a frame comprising upper horizontal side and front and rear members joined to each other at their ends, two upright frame members extending downward at each side of the structure, means on one of said members for limiting the movement of the rocking structure, a rocking structure pivoted on a horizontal axis on the others of said upright frame members, a rotary body pivoted on the forward part of the rocking structure and comprising compartments opening outward from the axis of said body and being deeper forward of the upright plane of said axis when said compartment is in the upper position, stops on the rotary body, latch means on the frame, and lifting means in the path of the stops, substantially as described.

14. In a weighing apparatus, the combination with a frame comprising four upper horizontal frame members and two downward-directed side members and an oblique brace at each side of the frame, one of said downward-directed frame members being provided with means for limiting the movement of the rocking member, of a rocking member pivoted to the other downward-directed frame members, a rotary body supported on the forward part of the rocking structure and comprising a plurality of compartments each opening outward from the axis of said body and being deeper forward of the upright plane of said axis when the compartment is in the upper position, and latch means for holding the rotary body against rotation when in its upper position and one of the compartments is in the upper position, said latch means being automatically disengaged by the bodily downward movement of the rotary body, substantially as described.

15. In a weighing apparatus, the combination with a frame comprising four upper horizontal frame members and two downward-directed side members and an oblique brace at each side of the frame, one of said downward-directed frame members being provided with means for limiting the movement of the rocking member, of a rocking member pivoted to the other downward-directed frame members, a rotary body supported on the forward part of the rocking structure and comprising a plurality of compartments each opening outward from the axis of said body and being deeper forward of the upright plane of said axis when the compartment is in the upper position, latch means for holding the rotary body against rotation when in its upper position and one of the compartments is in the upper position, said latch means being automatically disengaged by the bodily downward movement of the rotary body, and lifting means in operative relation with the frame and said body, substantially as described.

16. A weighing apparatus comprising a frame, a rocking structure pivoted to the lower part of the frame, a rotary compartment body supported by the forward part of the rocking structure, automatic means for holding the rotary structure against rotation when said body is in its upper position and one of its compartments is in the upper position, and means applied to the upper part of said frame for attaching said frame to a conveyor, substantially as described.

17. A weighing apparatus comprising a frame, a rocking structure pivoted to the frame, a rotary compartment body supported by the forward part of the rocking structure, automatic means for holding the rotary structure against rotation when said body is in its upper position and one of its compartments is in the upper position, and horizontal members adapted to extend to the frame of a conveyor and oblique members extending from the frame to the conveyor, substantially as described.

18. A weighing apparatus comprising a frame, a rocking structure pivoted to the frame, a rotary compartment body supported by the forward part of the rocking structure, automatic means for holding the rotary structure against rotation when said body is in its upper position and one of its compartments is in the upper position, and horizontal members extending across and secured to the frame and adapted to extend to a conveyor, and oblique members extending from the frame to the conveyor, substantially as described.

In testimony whereof I have signed my name, this 3d day of December, in the year one thousand nine hundred and twenty-three.

JESSE M. EVANS.